April 13, 1937.    F. ELLIOTT    2,076,985
TIRE CASING PLUG
Original Filed April 23, 1935
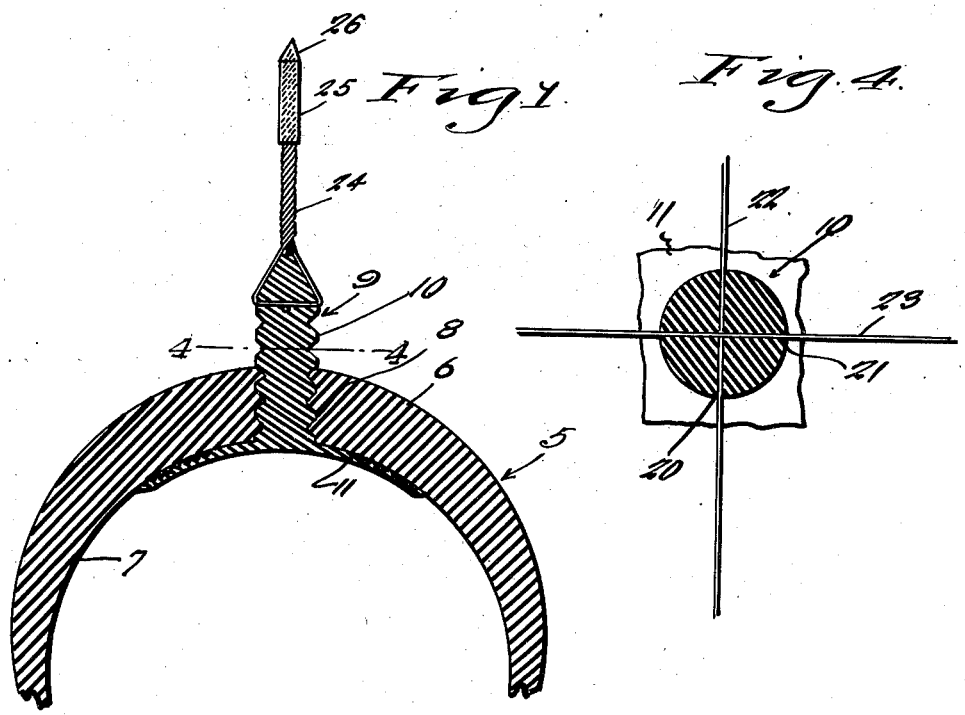
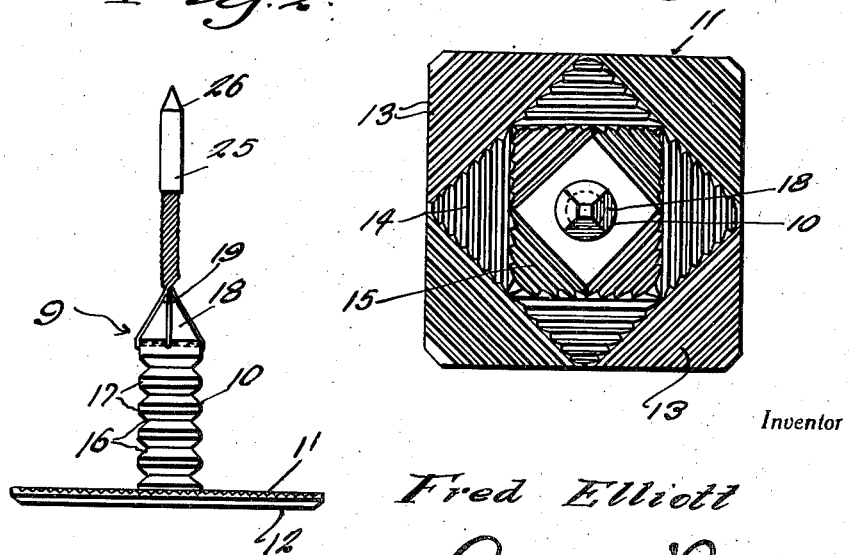
Inventor
Fred Elliott
By Clarence A. O'Brien
Attorney Patented Apr. 13, 1937

2,076,985

UNITED STATES PATENT OFFICE 2,076,985

TIRE CASING PLUG

Fred Elliott, Big Rapids, Mich.

Application April 23, 1935, Serial No. 17,843
Renewed February 6, 1937

1 Claim. (Cl. 152—26)

My invention relates to a plug for repairing a hole in a pneumatic tire casing, and an important object of the invention is to provide a plug of this character which is self supporting with respect to the casing after it has been installed, arrangements being provided therein to cause the plug to become practically a part of the lining of the casing and of the tread portion of the casing.

Another important object of my invention is to provide in a plug of the character indicated formations and structural arrangements which facilitate applying the plug in a workmanlike manner, the plug being provided with novel inserting means which enables forcibly pulling the plug into place in a hole through the tire casing much smaller than the plug.

Another important object of my invention is to provide in a plug of the character indicated including a base portion and a neck portion, ribs or grooves which better grip the portions of the casing engaged thereby and provide channels which may be filled with rubber cement or the like for producing adherence of the plug to the casing, and increasing the surface area in contact with the tire casing without increasing the bulk and size of the plug.

Other important objects of my invention will be apparent from a reading of the following description in connection with the drawing, wherein for purposes of illustration I have shown a preferred embodiment of my invention.

In the drawing:—

Figure 1 is a transverse vertical sectional view taken through a tire casing and through an embodiment of the invention.

Figure 2 is a side elevational view of the embodiment.

Figure 3 is a plan view of Figure 2.

Figure 4 is a horizontal sectional view taken through Figure 1 approximately on the line 4—4.

Referring in detail to the drawing, the numeral 5 generally designates the tire casing and the numeral 6 the tread portion thereof which has on its underside the fabric lining 7. The numeral 8 generally designates the hole through the casing which is to be repaired.

The numeral 9 generally designates the embodiment of the invention which includes the neck portion 10 which is passed through the hole 8 in the casing, and the numeral 11 generally designates the base of the embodiment which engages the lining or interior of the casing.

The base is a flat flexible plate of rubber which may have its underside covered with fabric as indicated by the numeral 12 to prevent vulcanization of the tube (not shown) which will contact the inward side thereof. The base 11 is preferably rectangular in form although it may assume either a round or a polygonal form. The upper surface of the plate 11 has the corners thereof provided with the diagonal grooves 13 defining triangular areas. Similarly grooved areas 14 located adjacent the corners have the grooves running parallel to the sides of the base, while triangular areas 15 are located to form a square and these are grooved parallel to the grooves of the corner areas 13. From the center of the plate 11 rises the neck 10 which is generally cylindrical in form and is provided with circumferential grooves 16 which are vertically and regularly spaced. These grooves 16 are V-shaped in cross section and define the ribs 17. Above the topmost groove 16 the ribs 17 define the base of a pyramidal top portion 18 which terminates in a flat upper end 19. Transverse intersecting bores 20 and 21 are provided in the uppermost rib 17 at the base of the pyramid 18 and wires 22 and 23 are disposed in these bores and the extending ends of these wires are brought together and twisted upon each other as indicated by the numeral 24 to provide the inserting needle for initially entering the plug in the hole in the casing. The upper end of the part 24 is covered with solder as indicated at 25 and provided with a point 26 facilitating entry into the hole to be repaired in the casing.

The device is used by covering the same or selected desired portions thereof with rubber cement and then inserting the same, needle-first in the hole in the casing to be repaired. In order to firmly seat the same in place the needle may be grasped and sufficient force exerted thereon to firmly seat the plug and adequately engage the plate 11 with the interior surface of the casing. The plug or that part which extends exteriorly of the casing may then be cut off slightly above that portion of the casing so that the same will wear down level with the exterior of the casing through use of the casing. The jagged edges of the opening to be repaired readily engage with and conform to the irregular contour of the cement covered grooves and ribs of the neck portion 10 so that a firm and close knit repair is produced in the hole. Similarly, the roughened surface of the plate 11 forms upon use of the tire, a firm and non-slipping vulcanized grip upon the interior of the casing.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claim.

What is claimed is:—

A plug for repairing holes in tire casings comprising a base to engage the interior side of the casing and a neck extending from the base and projecting through and in engagement with the size of the holes to be repaired, said neck at its outer end being provided with an outwardly tapering portion, said neck adjacent the outwardly tapering portion being provided with diametrically extending bores, wire members disposed through the bores and along the tapered surface of the tapered portion of the neck, said wires being twisted together so that the twisted portion binds against the extremity of said tapered portion, and a pointed body to which the outer ends of the wires are attached.

FRED ELLIOTT.